US012008126B2

(12) United States Patent
Waters et al.

(10) Patent No.: US 12,008,126 B2
(45) Date of Patent: Jun. 11, 2024

(54) ASYNCHRONOUS SUPERVISION FOR SOVEREIGN CLOUD PLATFORMS

(71) Applicant: Microsoft Technology Licensing, LLC, Redmond, WA (US)

(72) Inventors: Brian Scott Waters, Renton, WA (US); Martin Peter Check, Redmond, WA (US); Matthew Paul Erickson, Duvall, WA (US); Tyler S Wiegers, Redmond, WA (US); Christopher Glenn Maynard, Issaquah, WA (US); Siddhartha Rana, Bothell, WA (US); Dominic Mario Rael, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 17/448,849

(22) Filed: Sep. 24, 2021

(65) Prior Publication Data
US 2023/0093882 A1    Mar. 30, 2023

(51) Int. Cl.
*G06F 21/62* (2013.01)
*G06Q 50/26* (2012.01)

(52) U.S. Cl.
CPC ......... *G06F 21/6218* (2013.01); *G06Q 50/26* (2013.01)

(58) Field of Classification Search
CPC .............................. G06F 21/6218; G06Q 50/26
USPC .......................................................... 726/28
See application file for complete search history.

(56) References Cited

U.S. PATENT DOCUMENTS

| | | |
|---|---|---|
| 2013/0067020 A1 | 3/2013 | German et al. |
| 2016/0182525 A1 | 6/2016 | Zhu et al. |
| 2017/0041322 A1* | 2/2017 | Kurian .................... H04L 67/10 |
| 2017/0060734 A1 | 3/2017 | Raz et al. |
| 2020/0160856 A1 | 5/2020 | Kline et al. |
| 2020/0412723 A1 | 12/2020 | Shankar |
| 2021/0029128 A1* | 1/2021 | Rajasekaran ......... G06F 9/5061 |
| 2021/0044597 A1* | 2/2021 | Rahman ................. G06Q 10/10 |

(Continued)

OTHER PUBLICATIONS

"International Search Report and Written Opinion Issued in PCT Application No. PCT/US22/037939", dated Nov. 3, 2022, 15 Pages.

(Continued)

*Primary Examiner* — Michael S McNally
(74) *Attorney, Agent, or Firm* — Alleman Hall & Tuttle LLP

(57) ABSTRACT

A computer system that includes one or more processors configured to execute a secure sovereign manager that controls remote execution of commands on a sovereign cloud computing platform. The secure sovereign manager is configured to create an escorted session for an unqualified user for invoking commands on the sovereign cloud computing platform. The unqualified user does not have sovereign-trusted credentials that define qualifications required for accessing the sovereign cloud computing platform. The escorted session is asynchronously supervised by a qualified user that has sovereign-trusted credentials. The secure sovereign manager is configured to receive an indication of approval or denial of invocation of a received command. Based on at least receiving an indication of approval, the secure sovereign manager invokes the received command on the sovereign cloud computing platform.

18 Claims, 8 Drawing Sheets

(56) References Cited

U.S. PATENT DOCUMENTS

2021/0344485 A1* 11/2021 Levin .................... H04L 9/0825

OTHER PUBLICATIONS

"Azure for Secure Worldwide Public Sector Cloud Adoption", Retrieved from: https://pic.strathmore.edu/wpcontent/uploads/2019/03/Strathmore_Microsoft_Policy_Innovation_Centre_Azure_for_WW_Public_Sector.pdf, Feb. 2019, 35 Pages.

"Citrix Cloud", Retrieved from: https://docs.citrix.com/en-us/citrix-cloud/citrix-cloud.pdf, Retrieved Date: Jul. 30, 2021, 340 Pages.

"Remote Desktop Environment", Retrieved from: http://ottoaden.nl/i-see-bwuazr/remote-desktop-environment-c602cc#. Retrieved Date: Jul. 30, 2021, 5 Pages.

Chaput, Jonathan, "6 Tips for a Solid Remote Desktop Service (RDS) Deployment", Retrieved from: https://www.sherweb.com/blog/cloud-server/remote-desktop-service-rds/, May 6, 2020, 5 Pages.

Ondrejovicova, et al., "Deploying Remote Desktop Services with Itopia Cloud Automation Stack on Compute Engine", Retrieved from: https://cloud.google.com/architecture/partners/deploying-windows-rds-itopia, Retrieved Date: Jul. 30, 2021, 23 Pages.

Roche, Suzanne, "Sovereign Cloud Provider AUCloud Deploys Scalable Virtual Desktop as a Service Solution for the Australian National University", Retrieved from: https://www.australiacloud.com.au/media/sovereign-cloud-provider-aucloud-deploys-scalable-virtual desktop-as-a-service-solution-for-the-australian-national university/, Apr. 22, 2020, 9 Pages.

Schauland, Derek, "Using Just in Time Access to Secure Azure VMs", Retrieved from: https://cloudskills.io/blog/azure-just-in-time, Jun. 17, 2020, 9 Pages.

* cited by examiner

ASYNCHRONOUS SUPERVISION FOR SOVEREIGN CLOUD PLATFORMS

BACKGROUND

Enterprises are increasingly migrating to cloud computing services to meet their business needs. The advantages provided by cloud computing services, such as scalability, flexibility, and reduced operating costs are also valuable to sovereign entities, such as national, regional, or local government agencies. However, these sovereign entities often require a higher degree of security and control over access to the cloud platform compared to business enterprises, and typically require that only qualified operators or individuals escorted by a qualified operator are allowed to access or manipulate hardware and software resources of the sovereign cloud computing solution.

SUMMARY

A computer system is provided that comprises one or more processors configured to execute a secure sovereign manager that controls remote execution of commands on a sovereign cloud computing platform. The secure sovereign manager may be configured to create an escorted session for an unqualified user for invoking commands on the sovereign cloud computing platform. The unqualified user does not have sovereign-trusted credentials that define qualifications required for accessing the sovereign cloud computing platform. The escorted session may be asynchronously supervised by a qualified user that has sovereign-trusted credentials. The secure sovereign manager may be configured to receive a command from the unqualified user in the escorted session, and process the received command using a compliance analyzer to programmatically determine whether to present the received command for review by the qualified user supervising the escorted session. Based on at least a determination to present the received command for review, the secure sovereign manager may be configured to asynchronously present the received command to the qualified user. The secure sovereign manager may receive an indication of approval or denial of invocation of the received command from the qualified user. Based on at least receiving an indication of approval, the secure sovereign manager may invoke the received command on the sovereign cloud computing platform. Or, based on at least receiving an indication of denial, the secure sovereign manager may prevent invocation of the received command and send an error message to the unqualified user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
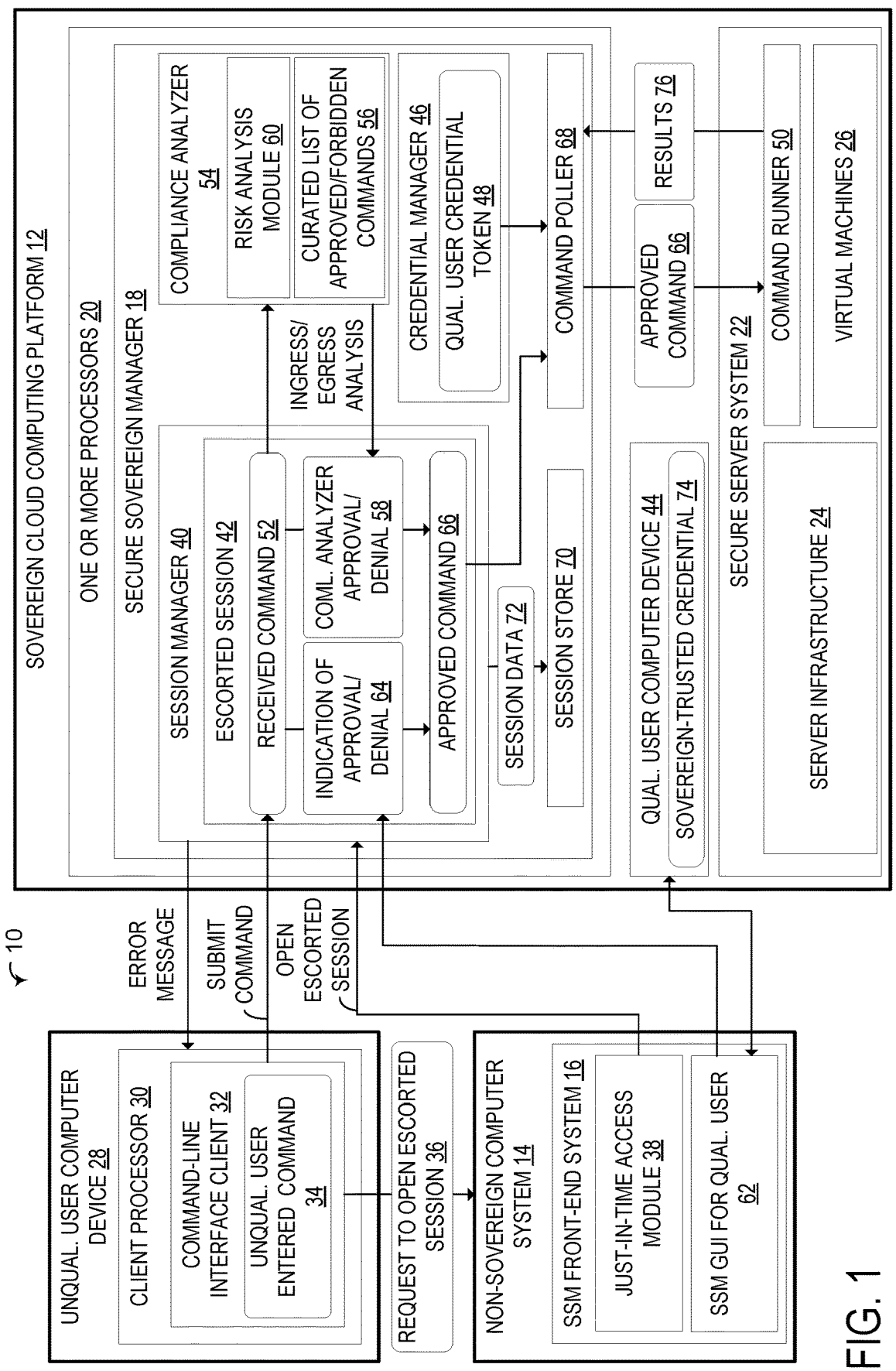
FIG. 1 shows a schematic view of an example computer system that implements a secure sovereign manager that controls remote execution of commands on a sovereign cloud computing platform, and provides asynchronous review of commands received from unqualified users that do not have sovereign-trusted credentials, according to one embodiment of the present disclosure.

Cloud computing services provide many benefits over private server infrastructure, such as scalability, flexibility, and reduced operating costs. Sovereign entities, such as national, regional, or local government agencies, would also benefit from moving toward cloud computing services, but have data security and accountability requirements that hinder adoption of current cloud computing services. For example, sovereign entities may require a higher degree of security and control over access to the sovereign cloud computing platform than is supported by conventional cloud computing deployments.

One challenge to deploying a cloud computing service for a sovereign entity is addressing security requirements that access to the sovereign entity's cloud platform should be controlled such that only qualified individuals are allowed to access or manipulate hardware and software resources of the sovereign cloud computing deployment. As a few non-limiting examples, these sovereign entities may require that the individuals accessing the sovereign cloud computing platform must have certain verified credentials such as residence, citizenship, security clearances, background checks, employment status, and other types of credentials that are vetted by authorized certification processes established by the sovereign entity.

However, experienced cloud platform technicians are still required to perform upkeep for the sovereign cloud computing platform, such as, for example, pulling down logs, troubleshooting, restarting virtual machines (VM), rebooting services, etc. The cloud computing service provider that is servicing these sovereign cloud computing platforms may be unable to acquire the specified credentials for all of their experience cloud platform technicians. Thus, it may be difficult for these service providers to employ enough people that have both the experience and skill set for servicing a cloud platform and the verified credentials specified by the sovereign entity.

One method to address this challenge is to create a process for qualified individuals that have the verified credentials required by the sovereign entity to escort unqualified individuals into the domain of the sovereign cloud computing platform, and physically watch the actions and entered commands of the unqualified individual through a remote desktop protocol (RDP) session. The qualified individual may then intervene and prevent any actions that are not allowed to be performed on the sovereign cloud computing platform according to the rules and protocols of the security requirements for that sovereign platform.

However, this solution faces several challenges. One challenge is that the one-to-one model of qualified to non-qualified individuals is difficult to scale, as the number of individuals required to service a sovereign cloud computing platform is essentially doubled. Further, for sovereign entities that have higher requirements regarding data security and require higher clearance levels, finding enough qualified individuals to escort all of the unqualified cloud platform technicians may be difficult.

Another challenge is that requiring a qualified individual to physically watch the actions of non-qualified individuals via a computer monitor in an RDP session makes it difficult for a qualified individual to supervise more than one unqualified individual at a time while ensuring that all actions of the unqualified individuals are being adequately checked. Additionally, qualified individuals may potentially need to take breaks, or situations may arise where the qualified individual may need to step away from their computer device and stop supervising the unqualified individual. As the unqualified individual needs to be continuously supervised in the RDP escort approach, the session would need to be paused or handed off to another qualified individual in these situations, which may introduce additional complications such as allocating responsibility if the unqualified individual is allowed to perform an unauthorized action on the sovereign cloud platform.

To address these issues, FIG. 1 illustrates an example computer system 10 that implements an asynchronous messaging platform that may, in one example, leverage a command-line interface that may support different command-line languages. Qualified users may use the asynchronous messaging platform to manage and adjudicate messages that may include commands to be executed when received from unqualified users. For example, the qualified users may use a graphical user interface (GUI) of the asynchronous messaging platform to allow, deny, and/or modify commands for execution. The qualified users may also asynchronously review any result or data capture for egress for the executed command, and allow, deny, and/or modify that result or data capture for egress from the sovereign cloud computing platform.

In this manner, the example computer system 10 provides the potential benefit of providing a qualified user with the tools and interfaces to asynchronously supervise a plurality of unqualified users, such as, for example, ten, fifteen, twenty, or more unqualified users. As used herein, the term asynchronous is used to describe the functionality of the messaging platform to receive a command from an unqualified user, store that command while waiting for review from a qualified user, present that command to the unqualified user at a later point in time, and then invoke that command upon approval from the qualified user. A similar process may also be performed for data that is being egressed from the sovereign cloud computing platform domain.

As illustrated in FIG. 1, the computer system 10 includes a sovereign cloud computing platform 12. The sovereign cloud computing platform 12 communicates with a non-sovereign computer system 14 over a computer network, such as, for example, a wide area network. Sovereign cloud computing platforms are defined herein to mean cloud computing platforms that are subject to access restrictions that prevent access by non-sovereign members without digital escort by an authorized sovereign member. Sovereign clouds include both governmental sovereign clouds (such as a national, regional, or local government cloud, military cloud, governmental agency cloud, etc.) and civil sovereign clouds (such as a public or private company cloud). An authorized sovereign member may be a user or operator that has sovereign-trusted credentials that define qualifications required for accessing the sovereign cloud computing platform, such as, for example, citizenship, security clearances, background checks, and other types of credentials.

The non-sovereign computer system 14 may include one or more server devices configured to run a secure sovereign manager (SSM) front-end system 16 that interfaces with a secure sovereign manager 18 run in the sovereign cloud computing platform 12. The SSM front-end system 16 and the SSM 18 are configured to provide an asynchronous messaging platform leveraging a command-line interface that allows qualified users to manage and adjudicate asynchronous messages/commands from unqualified users. In some examples, the non-sovereign computer system 14 may take the form of a public or non-sovereign cloud computing platform that includes functionality for securely accessing the sovereign cloud computing platform 12 that follows the rules and requirements of the sovereign cloud computing platform 12.

The sovereign cloud computing platform 12 includes one or more processors 20 of one or more server computer devices configured to execute the SSM 18 that controls remote execution of commands on the sovereign cloud computing platform 12. The sovereign cloud computing platform 12 further includes a secure server system 22 that includes server infrastructure 24 that provides host computer devices for hosting VMs 26 of the sovereign cloud computing platform 12. The secure server system 22 may comprise any suitable server system or data center infrastructure for cloud computing platforms. Access to the secure server system 22 from outside of the sovereign cloud computing platform 12 is managed by the secure sovereign manager 18.

As discussed above, in some cases, unqualified users may need to access the secure server system 22 of the sovereign cloud computing platform 12 to perform upkeep for the sovereign cloud computing platform, such as, for example, pulling down logs, troubleshooting, restarting virtual machines (VM), rebooting services, etc. These unqualified users may be experienced cloud platform technicians that do not have sovereign-trusted credentials that define qualifications required for accessing the sovereign cloud computing platform 12. These sovereign-trusted credentials may, for example, take the form of computer verifiable credentials for citizenship, security clearances, background checks, and other types of credentials granted to users.

To access the sovereign cloud computing platform 12, the unqualified user may use an unqualified user computer device 28 that includes a client processor 30 and other suitable computer components such as storage devices, network cards, etc. The client processor 30 of the unqualified user computer device 28 may be configured to execute a command-line interface client 32. The command-line interface client 32 may be configured to provide an interface for receive unqualified user entered commands 34 from the unqualified user. The command-line interface client 32 may be configured to use any suitable command-line language, such as, for example, POWERSHELL, BASH, etc. Using the command-line interface client 32, the unqualified user may enter commands that will be submitted to the sovereign cloud computer platform 12 for review by a qualified user, and see a current status of the entered command, such as, for example, "waiting for review", "approved", "denied", etc.

The command-line interface client 32 is further configured to communicate with the SSM front-end system 16 to open an escorted session where the unqualified user entered commands 34 may be submitted for review. In one example, the unqualified user may selected a particular sovereign cloud computing platform 12, and the command-line interface client 32 may be configured to send a request 36 to open an escorted session to the non-sovereign computer system 14.

The SSM front-end system 16 run by the non-sovereign computer system 14 may be configured to receive the request 36. In one example, the SSM front-end system 16 may include a just-in-time (JIT) module 38 that is configured to communicate with the sovereign cloud computing platform 12 to open a port for an escorted session for a duration of the session. For example, the sovereign cloud computing platform 12 may be configured to lock-down most or all ports, and may be configured to open a port for a certain duration of time upon receiving a valid request from the JIT module 38 of the SSM front-end system 16. It should be appreciated that the specific process for opening a port for the escorted session may be specified by the rules and protocols of each sovereign cloud computing platform 12.

The SSM front-end system 16 may communicate with the SSM 18 run by the sovereign cloud computing platform 12 to open an escorted session for the unqualified user of the unqualified user computer device 28. A session manager 40 of the SSM 18 may be configured to create an escorted session 42 for the unqualified user for invoking commands on the sovereign cloud computing platform 12. The session manager 40 may also be configured to determine a qualified user using a qualified user computer device 44 that will review commands received in the escorted session 42 and results or data captures resulting from those commands. The qualified user may be selected via any suitable methods, such as, for example, by programmatically assigning a currently available qualified user to the escorted session 42. As another example, each qualified user may select to supervise the escorted session 42 via an interface. As another example, each command received in an escorted session 42 may be added to an approval queue, and a plurality of qualified users may individually select commands from the approval queue for review.

Using one of the approaches discussed above, each escorted session is asynchronously supervised by a qualified user that has sovereign-trusted credentials, such as, for example, computer verifiable credentials for citizenship, security clearances, background checks, and other types of credentials granted to users. In one example, the sovereign-trusted credentials of the qualified user may be stored on their qualified user computer device 44, or in an account profile managed by the sovereign cloud computing platform 12. The secure sovereign manager 18 may be configured to include a credential manager 46 that is configured to retrieve a token(s) 48 for the qualified user's sovereign-trusted credentials. It should be appreciated that any suitable protocol may be used for verifying and storing the sovereign-trusted credentials that meet the rules and protocols of the sovereign cloud computing platform 12.

As will be discussed in more detail below, the token(s) for the qualified user's sovereign-trusted credentials may be attached to any commands in the escorted session 42 approved by that qualified user, and/or results or data captures approved for egress by that unqualified user. In one example, the secure server system 22 may include a command runner 50 that invokes commands on the secure server system 22, and may be configured to only invoke those commands if they include a verified token(s) for a known qualified user with sovereign-trusted credentials.

After the escorted session 42 has been created by the session manager 40, the unqualified user of the unqualified user computer device 28 may then proceed to enter commands 34 into the command-line interface client 32, which may be configured to then submit those commands 34 to the escorted session 42 for review by the qualified user. The escorted session 42 may be configured to receive the unqualified user entered command 34 as a received command 52. The received command 52 is not immediately invoked on the secure server system 22 of the sovereign cloud computing platform 12, but is instead held for review.

In one example, the SSM 18 may be configured to process the received command 52 using a compliance analyzer 54 to programmatically determine whether to present the received command 52 for review by the qualified user supervising the escorted session 42. The compliance analyzer 54 may be configured to programmatically process the received command 52 to estimate a potential risk that the command imposes on the sovereign cloud computing platform 12. For example, some commands may inherently have a risk of causing a data security breach, and other types of commands may have risks associated with the underlying server infrastructure 24 of the secure server system 22.

In one example, the compliance analyzer 54 may include a curated list of approved commands and/or a curated list of forbidden commands 56. To programmatically determine whether to present the received command 52 for review by the qualified user supervising the escorted session 42, the compliance analyzer 54 may be configured to compare the received command 52 to the curated lists 56 of approved commands and/or forbidden commands. In one example, the compliance analyzer 54 may determine that the received command 52 is included in the curated list 56 of approved commands. Thus, the compliance analyzer 54 may determine that the received command 52 is a type of command that has been pre-authorized for execution on the sovereign cloud computing platform 12 due to its minimal to no risk of causing a data security breach, adverse effects to the secure server system 22, etc. The compliance analyzer 54 may determine that the received command 52 will not be presented for review by the qualified user supervising the escorted session 40, and instead send a compliance analyzer approval 58 to the escorted session 42, and cause the received command 52 to be invoked on the sovereign cloud computing platform. On the other hand, if the received command 52 is not found in the curated list 56 of approved commands, the compliance analyzer 54 may determine that the received command 52 should be reviewed by the qualified user before being run on the secure server system 22.

In another example, to programmatically determine whether to present the received command 52 for review by the qualified user supervising the escorted session, the compliance analyzer 54 may be configured to determine that the received command 52 is included in the curated list 56 of forbidden commands. Thus, the compliance analyzer 54 may determine that the received command 52 has been determined to have a high risk of causing a data security breach, adverse effects to the secure server system 22, etc., and is thus forbidden to preclude a possibility of the received command being inadvertently approved for executed on the sovereign cloud computing platform 12 due to a mistake of the qualified user. The compliance analyzer 54 may determine that the received command 52 will not be presented for review by the qualified user supervising the escorted session 42, and prevent invocation of the received command 52 on secure server system 22. The compliance analyzer 54 may also be configured to cause the escorted session 42 to send an error message to the unqualified user of the unqualified user computer device 28 indicating that the received command 52 has been denied. As a few non-limiting examples, the curated list 56 of forbidden commands may include commands for functions such as decrypting data, storing data as plain text, and other types of commands that could potentially cause a breach in data security.

In another example, the compliance analyzer 54 may include a risk analysis module 60 configured to determine a risk value that indicates a potential security risk to the sovereign cloud computing platform 12 associated with invoking commands. The risk analysis module 60 may store predetermined risk values for different classes or types of commands. For example, commands that potentially could retrieve secured data may be classified with a high risk. On the other hand, commands that do not retrieve data and do not have the potential of causing harm to the secure server system 22 may be classified with a low risk. In one example, these predetermined risk values may be curated by an authorized user of the sovereign cloud computing platform 12. These risk values may also be updated over time as qualified users approve or deny received commands 52. For example, specific commands that have a high approval rate from the qualified users may be assigned a lower risk value over time, while specific commands that have a high denial rate from the qualified users may be assigned a higher risk value over time.

In one example, the risk analysis module 60 may include a machine learning model that is feedback trained to learn risk values associated with each command using a dataset of indications of approval or denial of invocation of each of those commands received from qualified users. For example, each time a qualified approves or denies a received command 52, the indication may be aggregated into a dataset and fed into the machine learning model during a feedback training session.

The machine learning model of the risk analysis module 60 may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

In one example, to programmatically determine whether to present the received command 52 for review by the qualified user supervising the escorted session 42, the compliance analyzer 54 may be configured to process the received command 52 using the risk analysis module 60 to determine a risk value associated with the received command 52. The risk value may be determined using the curated risk values associated with each type of command, and/or the output of the machine learning model. The compliance analyzer 54 may then determine that the received command 52 will be presented for review by the qualified user supervising the escorted session 42 based on at least the risk value associated with the received command 52. For example, if the risk value associated with the received command 52 is above a threshold risk value that may be set according to the rules and protocols of the sovereign cloud computing platform 12. It should be appreciated that different sovereign entities may have different requirements for data security, and thus may have different risk thresholds.

The compliance analyzer 54 may then cause the received command 52 and the determined risk value to be asynchronously presented to the qualified user. On the other hand, if the risk value is below the threshold risk value, the compliance analyzer 54 may be configured to send a compliance analyzer approval 58 to the escorted session 42 and cause the received command 52 to be invoked on the secure server system 22 without requiring review from the qualified user of the qualified user computer device 44.

Using these processes, the compliance analyzer 54 may filter the received commands 52 to determine whether each particular received command 52 requires review by a qualified user, such that at least a portion of the received commands 52 may be programmatically approved/denied without intervention from a human. In this manner, the compliance analyzer 54 provides the potential benefit of reducing a review load assigned to the qualified users, which may allow each unqualified user to potentially supervise more unqualified users at a time.

As discussed above, the compliance analyzer 54 may determine that the received command 52 should be programmatically approved or denied, and not sent to the qualified user for review. On the other hand, for the other types of received commands 52 that are not automatically and programmatically approved or denied, the compliance analyzer 54 may be configured to determine that the received command 52 should be reviewed. Based on at least a determination to present the received command 52 for review, the SSM 18 may be configured to asynchronously present the received command 52 to the qualified user that is supervising that escorted session 42.

In one example, the session manager 40 may be configured to interface with a client on the qualified user computer device 44 to display a graphical user interface (GUI) that presents the received command 52. In another example, the qualified user computer device 44 may be configured to communicate with the SSM front-end system 16 of the non-sovereign computer system 14 to access a SSM GUI 62 for the qualified user. The SSM front-end system 16 may include a profile manage system, and may verify the qualified user using log-in credentials and/or an authentication protocol.

The SSM GUI 62 for the qualified user of the qualified user computer device 44 may present the received command 52. The SSM GUI 62 may include GUI elements for receiving user input from the qualified user. For example, the SSM GUI 62 may include a GUI element for entering an indication of approval, a GUI element for entering an indication of denial, a GUI element for entering a modification of the received command 52, etc. The SSM GUI 62 may also include other types of data, such as, for example, a summary of commands that the unqualified user has entered in the current escorted session 42, a risk value associated with the received command under review, etc.

The SSM front-end system 16 may send the user input received from the qualified user, which may include an indication of approval or denial of invocation of the received command 52. The session manager 40 may be configured to receive the indication 64 of approval or denial of invocation of the received command 52 from the qualified user. The indication 64 may be received via the SSM GUI 62 of the SSM front-end system 16 in one example, or directly from the qualified user computer device 44 in another example. It should be appreciated that other suitable processes and architectures for receiving the indication 64 from the qualified user may also be implemented by the SSM 18.

Based on at least receiving an indication 64 of approval, the session manager 40 may be configured to cause the received command 52 to be invoked on the sovereign cloud computing platform 12. As illustrated in FIG. 1, the session manager 40 may be configured to determine that the received command 52 is an approved command 66 based on either/both receiving an indication 64 of approval from the qualified user or receiving a compliance analyzer approval 58 from the compliance analyzer 54. In some examples, the qualified user may modify the received command, such as by modifying an argument of a function, etc., and the modified command may be used as the approved command 66.

The approved command 66 may then be sent to a command poller 68, which causes the approved command 66 to be executed on the secure server system 22 via the command runner 50. In some examples, the command poller 68 may be generated by the session manager 40 for each escorted session 42. The command poller 68 may also retrieve a token(s) for the qualified user's credentials from the credential manager 46, and attach the token(s) to the approved command 66 that was approved by that qualified user. The compliance analyzer 54 may have a separate authorization procedure for verifying that the approved command 66 was approved by the compliance analyzer 54 rather than a particular qualified user.

On the other hand, based on at least receiving an indication of denial, the SSM 18 may be configured to prevent invocation of the received command 42 on the secure server system 22. After preventing invocation, the session manager 40 may be configured to send an error message to the unqualified user computer device 28 to be presented to the unqualified user. For example, the error message may indicate that the received command 52 was denied by the qualified user supervising the escorted session 42.

As illustrated in FIG. 1, the SSM 18 may further include a session store 70 that stores session data 72 for each escorted session 42 created by the session manager 40. The session data 72 may include metadata describing events that occurred during the escorted session 42 and/or data that may be used to recreate the escorted session 42 at a later point in time. In one example, the session data 72 stored in the session store 70 may include a log of invoked commands that were approved by the qualified user of the qualified user computer device 44. The session data 72 may include the verified sovereign-trusted credential 74 that was attached to the invoked commands that were approved by that qualified user in the form of the token(s) 48. The session store 70 may also include a log of each denial entered by each qualified user. In this manner, the session store 70 may store a history of the actions, including approvals and denials, made by each qualified user in the escorted sessions 42 such that those actions may be reviewed at a later point in time during a security audit.

In some examples, invocation of an approved command 66 on the secure server system 22 of the sovereign cloud computing platform 12 may include one or more results or data captures 76 associated with the approved command 66. For example, a command to pulldown a log for a VM 26 will cause a result or data capture 76 to be generated and returned to the command poller 68. The SSM 18 may be configured to capture the result 76 of invocation of the received command 52 on the sovereign cloud computing platform 12, and hold that result 76 from being accessed by the unqualified user of the unqualified user computer device 28 that entered the received command 52 until a review process has been performed for the result 76.

After being captured, the result 76 may be scanned by the compliance analyzer 54 to programmatically determine whether to present the result 76 for review by the qualified user supervising the escorted session 42. The compliance analyzer 54 may be configured to recognize whether the result 76 contains certain data types or fields that have a high risk of being sensitive data, originated from a file location that includes sensitive data, etc. It should be appreciated that the compliance analyzer 54 may scan the results 76 to identify other types of factors that are associated with a risk that the result 76 could include data that should not be egressed from the sovereign cloud computing platform 12. In one example, the risk analysis module 60 of the compliance analyzer 54 may learn over time what types of data and results 76 are denied by the qualified users, and adjust stored risk factors associated with each of those types of data and results 76.

In one example, if the risk analysis module 60 determines that a risk level associated with the result 76 is below a threshold risk value, the compliance analyzer 54 may be configured to send a compliance analyzer approval 58 for the result 76, and cause the result 76 to be stored in a location that is accessible by the unqualified user computer device 28 that has been authenticated by the sovereign cloud computing platform 12. On the other hand, if the risk analysis module 60 determines that the risk level associated with the result 76 is higher than the threshold risk value, the compliance analyzer 54 may determine that the result 76 should be presented to the qualified user supervising the escorted session 42 for review.

Based on at least a determination to present the result 76 for review, asynchronously present the result 76 to the qualified user. The result 76 may be presented using the SSM GUI s 62 of the SSM front-end system 16, or by directly sending the result 76 or a summary thereof to the qualified user computer device 44 within the domain of the sovereign cloud computing platform 12. The SSM 18 may receive an indication of approval or denial 64 of unqualified user access to the result 76 from the qualified user.

Based on at least receiving an indication of approval from either the qualified user or the compliance analyzer 54 according to the processes described above, the SSM 18 may be configured to post the result 76 at a storage location accessible by the unqualified user via the unqualified user computer device 28. For example, the result 76 may be posted to an endpoint of the sovereign cloud computing platform 12, and may send a link to that endpoint to the unqualified user computer device 28 through the escorted session 42. Before allowing access to the result 76, the SSM 18 may be configured to authenticate the unqualified user computer device 28 to ensure that the device is the same device that started the escorted session 42. On the other hand, based on at least receiving an indication of denial, the SSM 18 may be configured to prevent access to the result 76 by the unqualified user, and send an error message to the unqualified user computer device 28 indicating that access to the result 76 has been denied.

Figure 2:
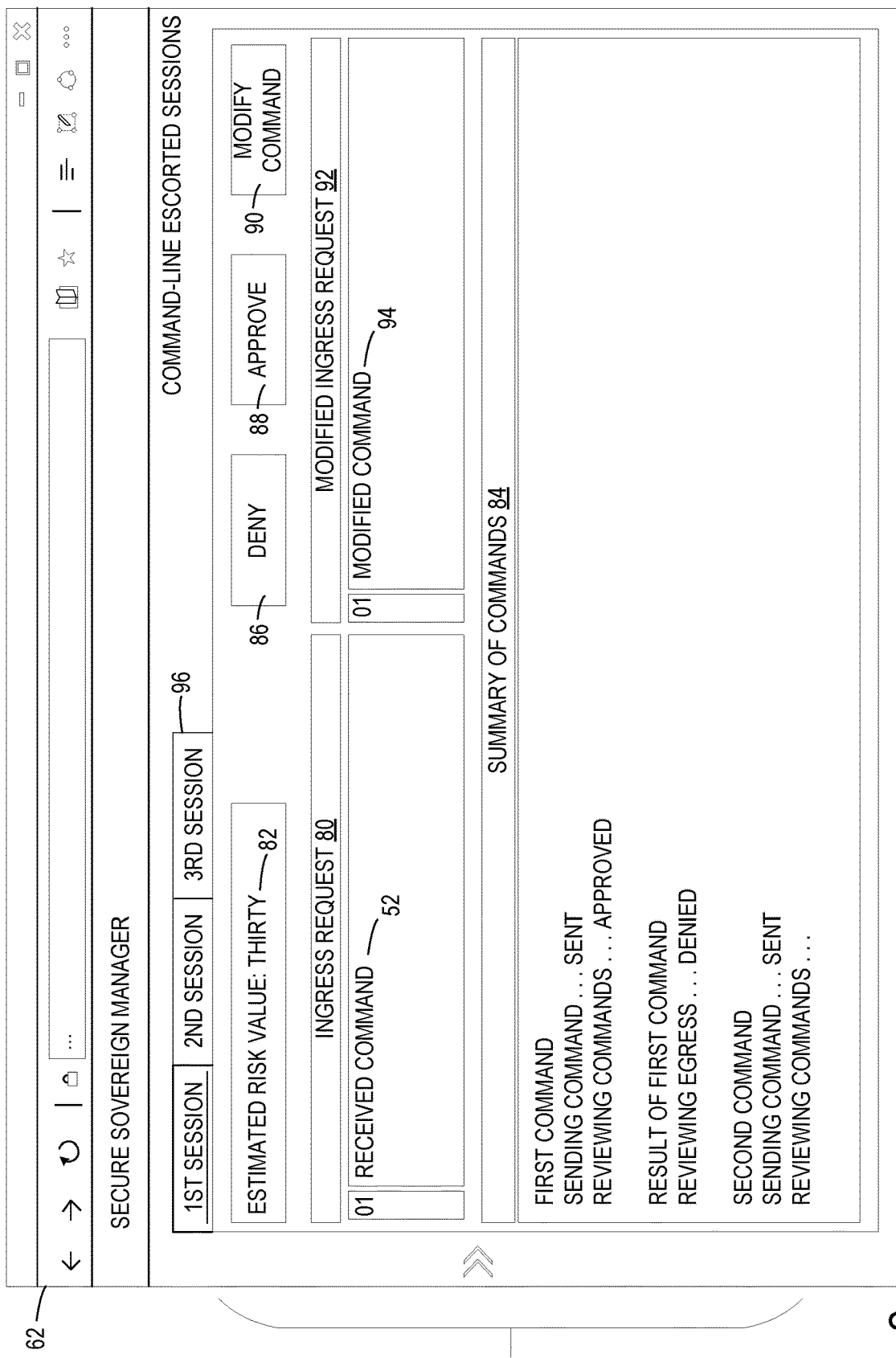
FIG. 2 shows an example graphical user interface for asynchronously presenting a received command to a qualified user and receiving user input for approving or denying invocation of the received command on the sovereign cloud computing platform implemented by the computer system of FIG. 1.

FIG. 2 shows an example SSM GUI 62 for the qualified user that is presented via the qualified user computer device 44. In one example, the SSM GUI 62 may be run by the SSM front-end system 16 on the non-sovereign computer system 14. For example, the unqualified user may log-in to an account on a website to access the SSM GUI 62. As another example, the SSM GUI 62 may be run on the qualified user computer device 44 or on a computer device located within the domain of the sovereign cloud computing platform 12.

The SSM GUI 62 may include a plurality of GUI elements 78 that present information to the qualified user and receive user input. In one example, a GUI element 78 for an ingress request 80 may present the received command 52 to the unqualified user. As shown, the received command 52 may be held after being received from the unqualified user, and asynchronously presented to the qualified user for review.

The SSM GUI 62 may include a GUI element 78 that shows an estimated risk value 82 associated with the received command 52 that was determined by the risk analysis module 60 if the compliance analyzer 54. The estimated risk value 82 may help the qualified user triage their attention, so that received commands 52 with a higher associated risk value may be given a more thorough review.

In one example, to further help the qualified user review the received command 52, the SSM GUI 62 may be configured to asynchronously present a summary of commands 84 alongside the received command 52 to the qualified user supervising the escorted session 42. The summary of commands 84 may be generated by the session manager 40, and may include a summary of the commands that have been received from the unqualified user in the escorted session 42. For example, the summary of commands 84 may include each received command 52, and a sequence that the commands were received. By viewing the sequence of commands received from the unqualified user, the qualified user may be given context for the most current received command 52, and understand whether the received command 52 make sense in the context of previous commands received from the unqualified user. The summary of commands 84 may also include a summary of the past review decisions for the escorted session 42, such as whether each received command 52 has been approved or denied, and whether the result 76 from those commands have been approved or denied. It should be appreciated that the summary of commands 84 may include other types of data about the escorted session 42 that may help the qualified user with reviewing the current received command 52.

The SSM GUI 62 may also include GUI elements 78 for entering user input for denying 86 the received command, approving 88 the received command, and modifying 90 the received command. After selecting the GUI element 78 for approving 86 the received command, or selecting the GUI element 78 for denying 88 the received command, a corresponding indication of approval or denial 64 may be sent to the session manager 40 for the received command 52.

After selecting the GUI element 78 for modifying 90 the received command 52, the SSM GUI 62 may present a copy of the received command 52 that is modifiable in a modified ingress request 92 GUI element 78. The session manager 40 may receive a modification input from the qualified user that includes a modification to the received command 52 via the modified ingress request 92 GUI element 78. For example, the modification input may include an addition, deletion, or another type of change to the received command 52, such as a change to the arguments of a function. The session manager 40 may then modify the received command 52 based on the modification input. The modified command 94 may be presented to the qualified user via the SSM GUI 62. The qualified user may then select the GUI element 78 to approve 88 the modified command 94. The session manager 40 may then receive an indication of approval 64 of invocation for the received command 52 that has been modified based on the modification input, and may cause the modified command 94 to be invoked on the sovereign cloud computing platform 12.

As illustrated in FIG. 2, the SSM GUI 62 may also include GUI elements 78 for navigating to different escorted sessions 42 that are being concurrently supervised by the same qualified user. In this example, the SSM 18 may be configured to create a plurality of escorted sessions 42 for a plurality of unqualified users. Further, the plurality of escorted sessions 42 may be assigned to the same qualified user to synchronously supervised by the qualified user concurrently. In this manner, a single qualified user may supervise and review received commands for a many qualified users at the same time, such as, for example, ten, fifteen, twenty, or more unqualified users through a corresponding number of escorted sessions 42. As shown in FIG. 2, the qualified user may tab through the different escorted sessions 42 that are currently live and assigned to that qualified user via the escorted session tab 96 GUI element.

Figure 3:
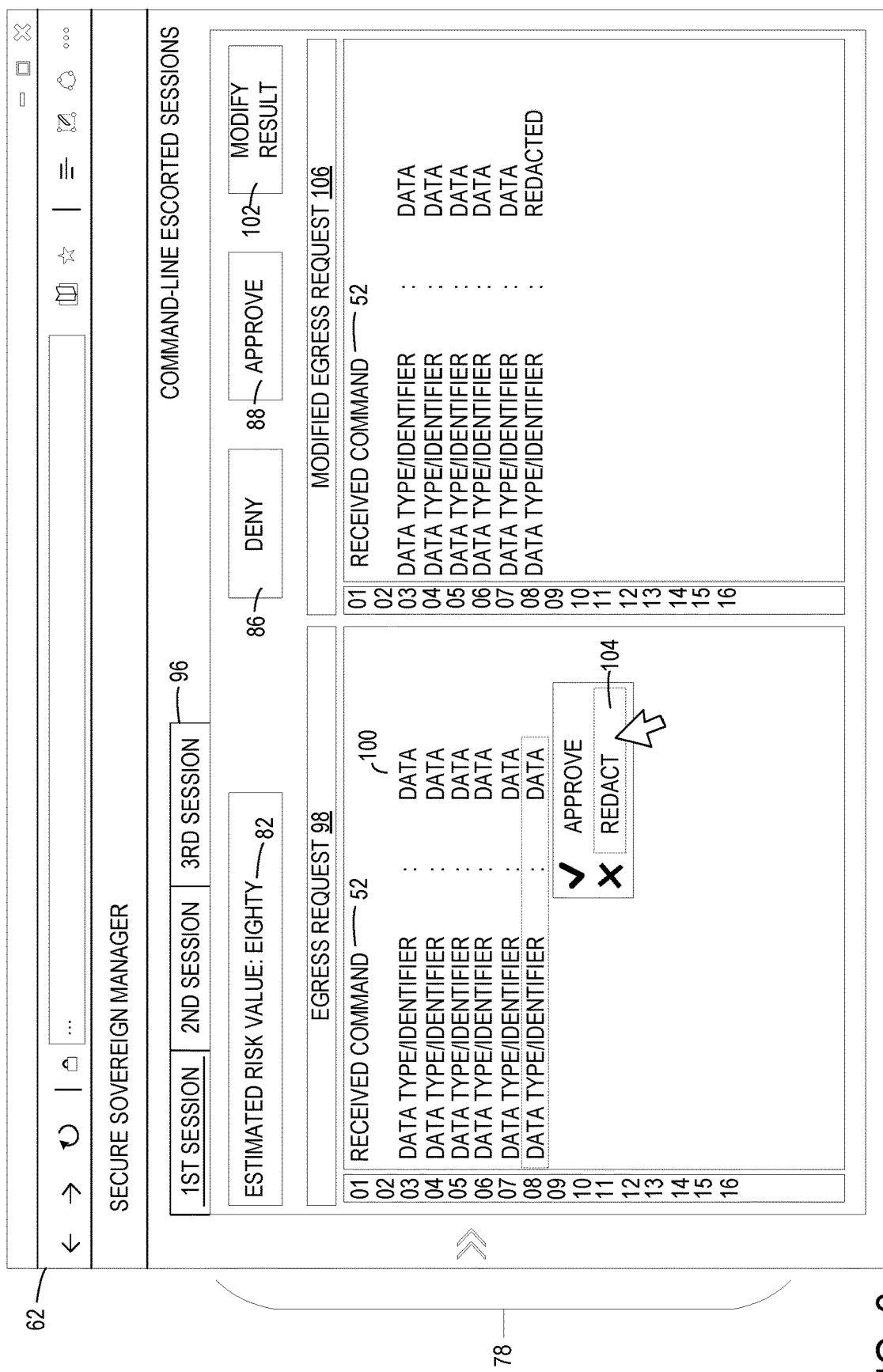
FIG. 3 shows an example graphical user interface for asynchronously presenting a result of an invoked command for review by a qualified user and receiving user input for approving or denying access to the result by an unqualified user implemented by the computer system of FIG. 1.

FIG. 3 illustrates an example SSM GUI 62 with GUI elements 78 for asynchronously presenting the result 76 to the qualified user. As shown, the SSM GUI 62 may include a GUI element 78 for presenting an egress request 98, which may include the result 76 for the current received command 52 that has been captured and waiting for approval/denial. The portions of data 100 contained in the result 76 may be shown via a command-line interface style. However, it should be appreciated that other formats may be used to present the results 76 and the contained data to the qualified user for review.

The qualified user may interact with GUI elements 78 to enter input, including an estimated risk value GUI element 82 that indicates a potential risk of allowing the request 76 to be egressed from the sovereign cloud computing platform 12. The estimated risk value may be determined by the compliance analyzer 54 using the risk analysis module 60. The GUI elements 78 may also include elements to deny 86 the egress request, approve 88 the egress request, and/or modify 102 portions of the egress request. Based on the qualified user selecting the deny 86 or approve 88 GUI elements 78, a corresponding indication of allowance or denial may be sent to the session manager 40, which may allow or prevent access to the result 76 for the unqualified user accordingly. For example, based on at least receiving an indication of approval, the SSM 18 may be configured to post the result 76 at a storage location accessible by the unqualified user. On the other hand, based on at least receiving an indication of denial, the SSM 18 may be configured to prevent access to the result 76 by the unqualified user, and send an error message to the unqualified user computer device 28.

Using the modify result 102 GUI element 78, the qualified user may enter a modification input. The SSM 18 may receive a modification input from the qualified user that includes a content modification to the result 76. For example, the user may select the modify result 102 GUI element 78, which may open a tool to approve or redact individual portions of the results 76. The SSM 18 may receive that modification input entered via the tool, and modify a content of the result 76 based on the modification input. FIG. 3 shows an example modification input 104 that includes the qualified user entering a redaction modification to redact a portion of data in the result. The SSM 18 may receive the modification input that is a redaction of one or more portions of content of the result 76, and may accordingly remove, cover, or otherwise redact the indicated portion of content. FIG. 3 shows an example modified egress request 106 that includes the content of the result 76 that has been modified to have a redacted portion of data. The qualified user may then select the approve 88 GUI element 78 to send an indication of approval of unqualified user access to the result 76 that has been modified based on the modification input 104.

Figure 4:
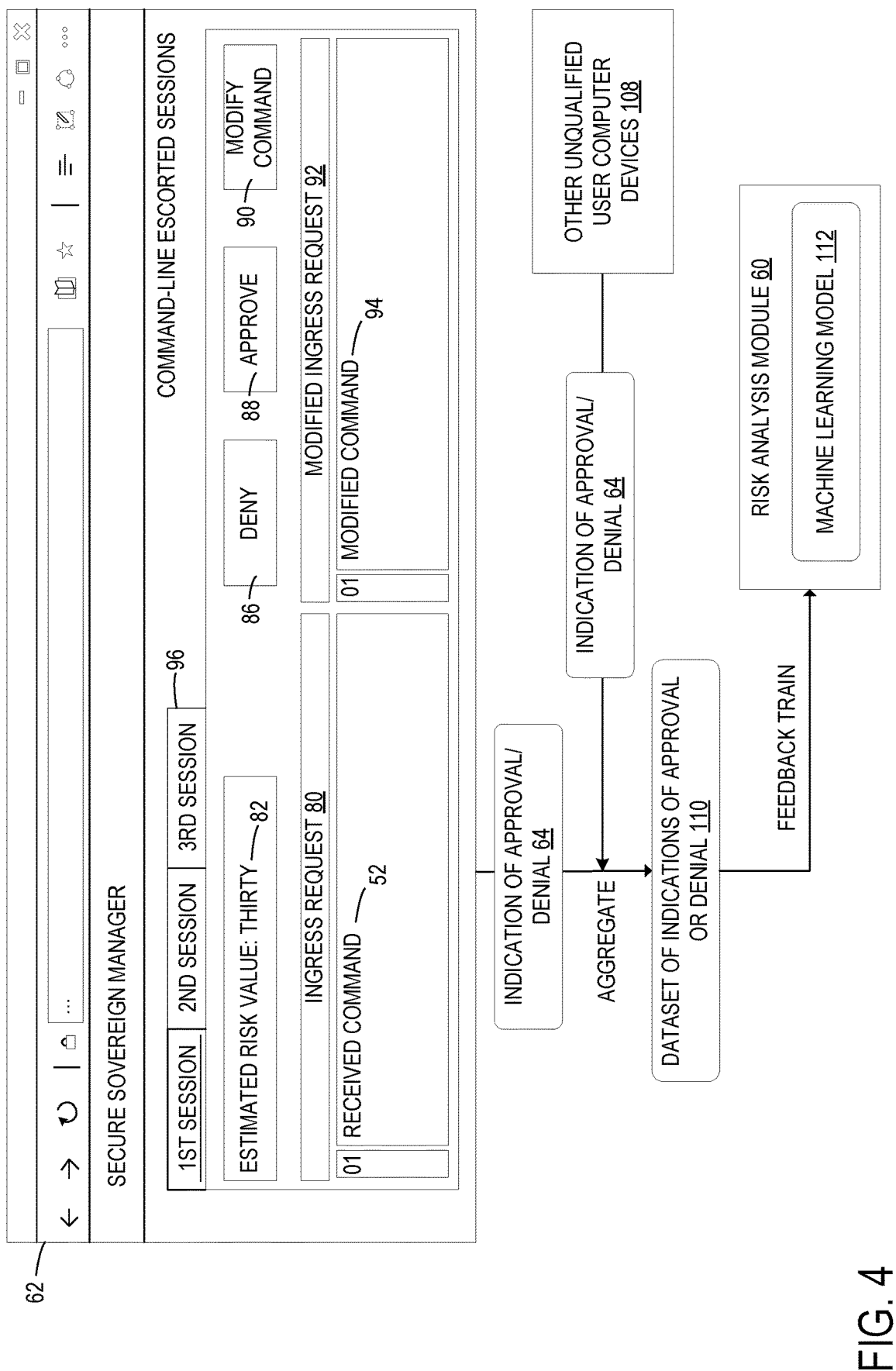
FIG. 4 shows an example feedback training process for training a machine learning model to learn risk levels associated with different commands implemented by the computer system of FIG. 1.

FIG. 4 shows an example where the user input from the qualified users for indications of approval/denial 64 received via the SSM GUI 62 may be aggregated from the qualified user and other qualified user computer devices 108 of the sovereign cloud computing platform 12. The indications of approval/denial 108 may be aggregated into a dataset 110 of indications of approval/denial. Each indication of approval/denial 64 may serve as ground-truth data, and may be used to perform feedback training on a machine learning model 112 of the risk analysis module 60. The machine learning model 112 may be trained in this manner to learn risk values associated with different commands and different types of results. The machine learning model 112 may be continuously trained over time as new indications of approval/denial 64 are received.

Figure 5:
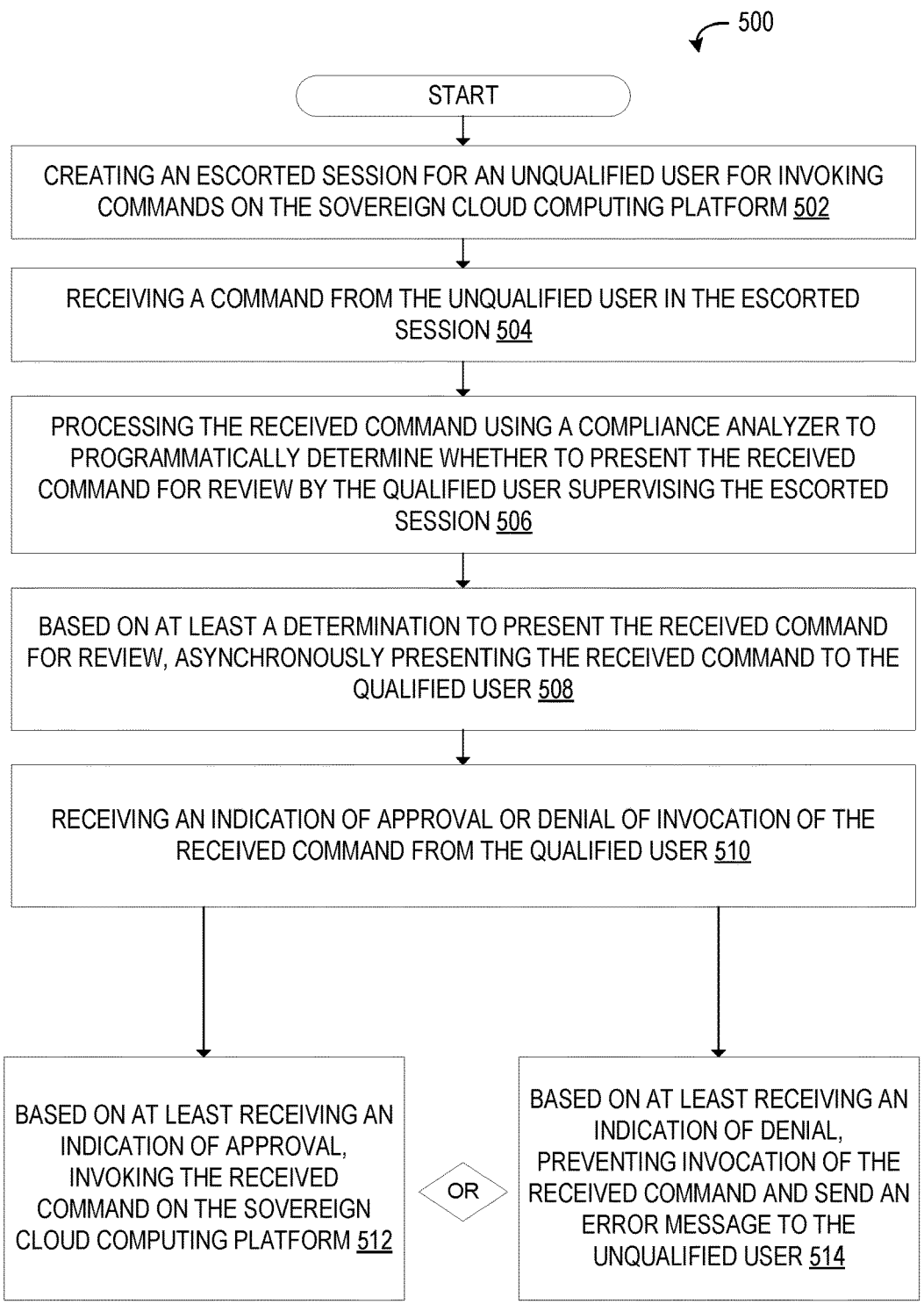
FIG. 5 shows a flowchart of a computer-implemented method for controlling remote execution of commands on a sovereign cloud computing platform, according to one embodiment of the present disclosure.

FIG. 5 shows a flowchart for an example computer-implemented method 500 for an asynchronous messaging platform where qualified users may manage and adjudicate messages that may include commands to be executed when received from unqualified users. The method 500 may be implemented on a server system of a sovereign cloud computing platform, and may be implemented by one or more processors executing a secure sovereign manager that controls remote execution of commands on the sovereign cloud computing platform.

At step 502, the method 500 may include creating an escorted session for an unqualified user for invoking commands on the sovereign cloud computing platform. The escorted session may be created in response to receive a request from the unqualified user to open a session for submission of commands. The sovereign cloud computing platform may have locked-down ports, and may be configured to open a port for communication with a computer device of the unqualified user upon authenticating the request.

The unqualified user does not have sovereign-trusted credentials that define qualifications required for accessing the sovereign cloud computing platform. The sovereign-trust credentials may include, for example, citizenship, security clearances, background checks, and other types of credentials. The escorted session is asynchronously supervised by a qualified user that has sovereign-trusted credentials. The sovereign-trusted credentials may be verified by a credential manager of the secure sovereign manager.

At 504, the method 500 may include receiving a command from the unqualified user in the escorted session. The command may be received over a computer network, such as, for example, a wide area network. The command may be entered into a command-line interface implementing a command-line language, such as POWERSHELL, BASH, etc.

At 506, the method 500 may include processing the received command using a compliance analyzer to programmatically determine whether to present the received command for review by the qualified user supervising the escorted session. The compliance analyzer may compare the received command to curated lists of approved and forbidden commands to determine whether to programmatically approve or forbid the received command from being invoked without requiring review from the qualified user. The received command may also be processed by a risk analysis module that determines a risk level associated with the received command. The compliance analyzer may determine that the received command should be reviewed by the qualified user if the determined risk level is higher than a threshold risk level.

At 508, the method 500 may include, based on at least a determination to present the received command for review, asynchronously presenting the received command to the qualified user. The received command may be presented to the qualified user via a SSM GUI. The received command may be held and prevented from being executed until the qualified user has reviewed the command at a later point in time.

At 510, the method 500 may include receiving an indication of approval or denial of invocation of the received command from the qualified user. The method 500 may continue to step 512 or 514 according to the indication received from the qualified user.

At 512, the method 500 may include, based on at least receiving an indication of approval, invoking the received command on the sovereign cloud computing platform.

At 514, the method 500 may include, based on at least receiving an indication of denial, preventing invocation of the received command and send an error message to the unqualified user.

Figure 6:
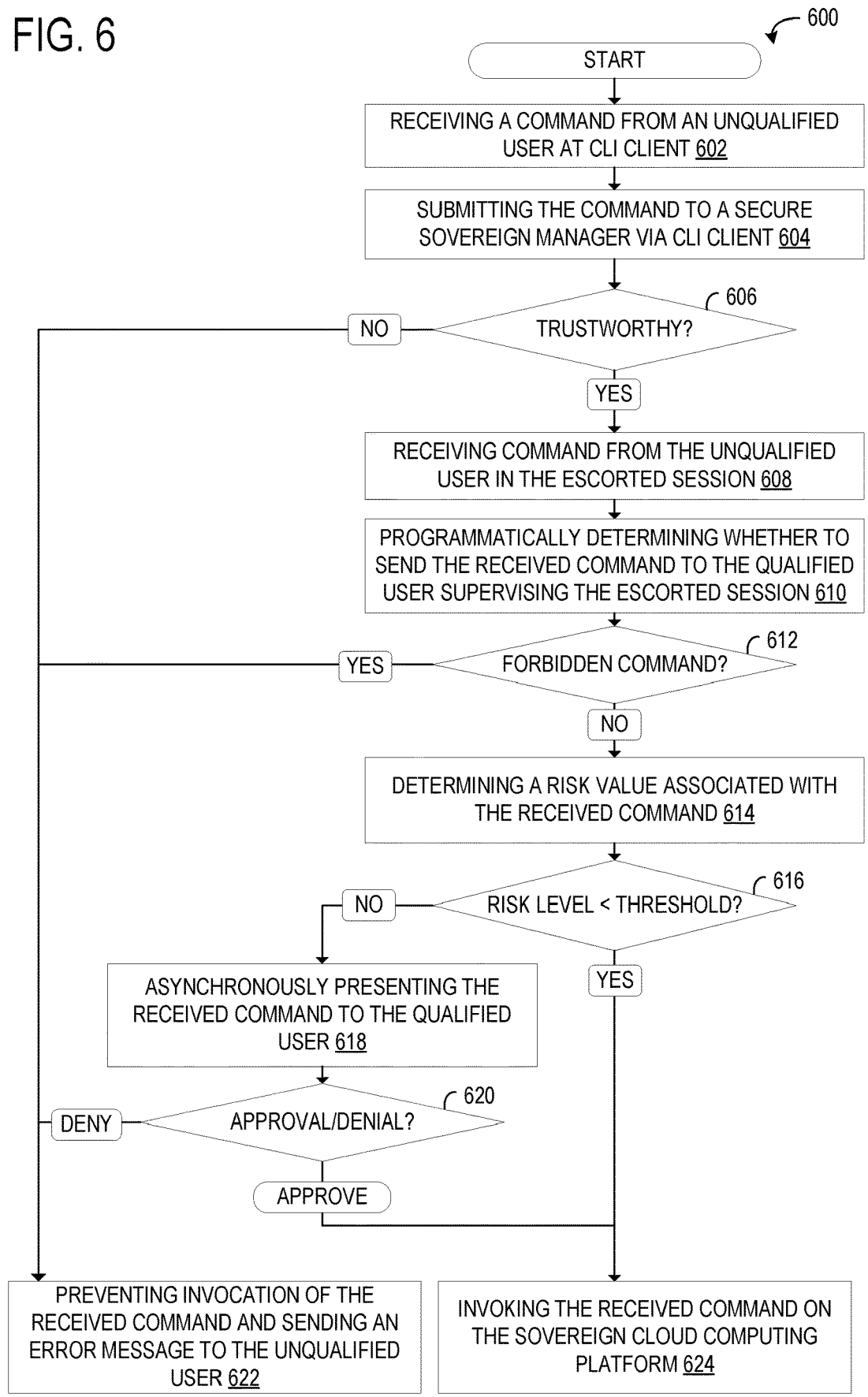
FIG. 6 shows a flowchart of a computer-implemented method for processing a received command using a compliance analyzer and asynchronously presenting a received command to a qualified user for review, according to one embodiment of the present disclosure.

FIG. 6 shows a flow chart for an example method 600 that may be implemented by the secure sovereign manager for determining whether to invoke or prevent a command received from a user.

At 602, the method 600 may include receiving a command from an unqualified user at a command-line interface client. The command-line interface client may be executed by a client processor of an unqualified user computer device. The command-line interface client may provide a GUI for the unqualified user to enter commands using a command-line language.

At 604, the method 600 may include submitting the command to a secure sovereign manager via the command-line interface client.

At 606, the method 600 may include performing an authentication protocol to determine whether the command-line interface client is trustworthy. If the command-line client is not trustworthy, the method 600 processed directly to step 622 and may include preventing invocation of the received command and sending an error message to the unqualified user.

If the command-line client is trustworthy, the method 600 may proceed to step 608 and may include receiving the command from the unqualified user in the escorted session at the secure sovereign manager.

At 610, the method 600 may include programmatically determining whether to send the received command to the qualified user supervising the escorted session. In one example, the compliance analyzer includes a curated list of forbidden commands. In this example, the method 600 may proceed to step 612, and may include determining whether the received command is included in the curated list of forbidden commands.

If the received command is included in the curated list of forbidden commands, the method 600 may include determining that the received command will not be presented for review by the qualified user supervising the escorted session. The method 600 may then proceed directly to step 622 and may include preventing invocation of the received command and sending an error message to the unqualified user.

On the other hand, if the received command is not included in the curated list of forbidden commands, the method 600 may proceed to step 614 and may include determining a risk value associated with the received command. In this example, the compliance analyzer may include a risk analysis module configured to determine a risk value that indicates a potential security risk to the sovereign cloud computing platform associated with invoking commands. Step 614 may further include processing the received command using the risk analysis module to determine a risk value associated with the received command.

At step 616, the method 600 may include determining whether a risk level associated with the received command is below a threshold risk level. In one example, the threshold risk level may be a value that is set according to requirements and protocols of the secure sovereign cloud computing platform. In another example, the compliance analyzer includes a curated list of approved commands. In this example, step 616 may include determining whether the received command is included in the curated list of approved commands. If the received command is included in the curated list of approved commands, then the risk level may be determined to be below the threshold risk level. If the received command is not included in the curated list of approved commands, then the risk level may be determined to be above the threshold risk level.

If the risk level associated with the received command is determined to be below the threshold risk level, the method 600 may include determining that the received command will not be presented for review by the qualified user supervising the escorted session, and the method 600 may proceed to step 624, which may include invoking the received command on the sovereign cloud computing platform.

On the other hand, if the risk level associated with the received command is determined to be above the threshold risk level, the method 600 may include determine that the received command will be presented for review by the qualified user supervising the escorted session, and the method 600 may proceed to step 618.

At 618, the method 600 may include asynchronously presenting the received command to the qualified user. The received command may be presented to the qualified user via a SSM GUI. The received command may be held and prevented from being executed until the qualified user has reviewed the command at a later point in time.

At 620, the method 600 may include determining whether receiving an indication of approval or denial of invocation of the received command from the qualified user. If the qualified user approves the received command, the method 600 may proceed to step 624, and the method 600 may include invoking the received command on the sovereign cloud computing platform.

On the other hand, if the qualified user denies the received command, the method 600 may proceed to step 622, and may include preventing invocation of the received command and sending an error message to the unqualified user.

Figure 7:
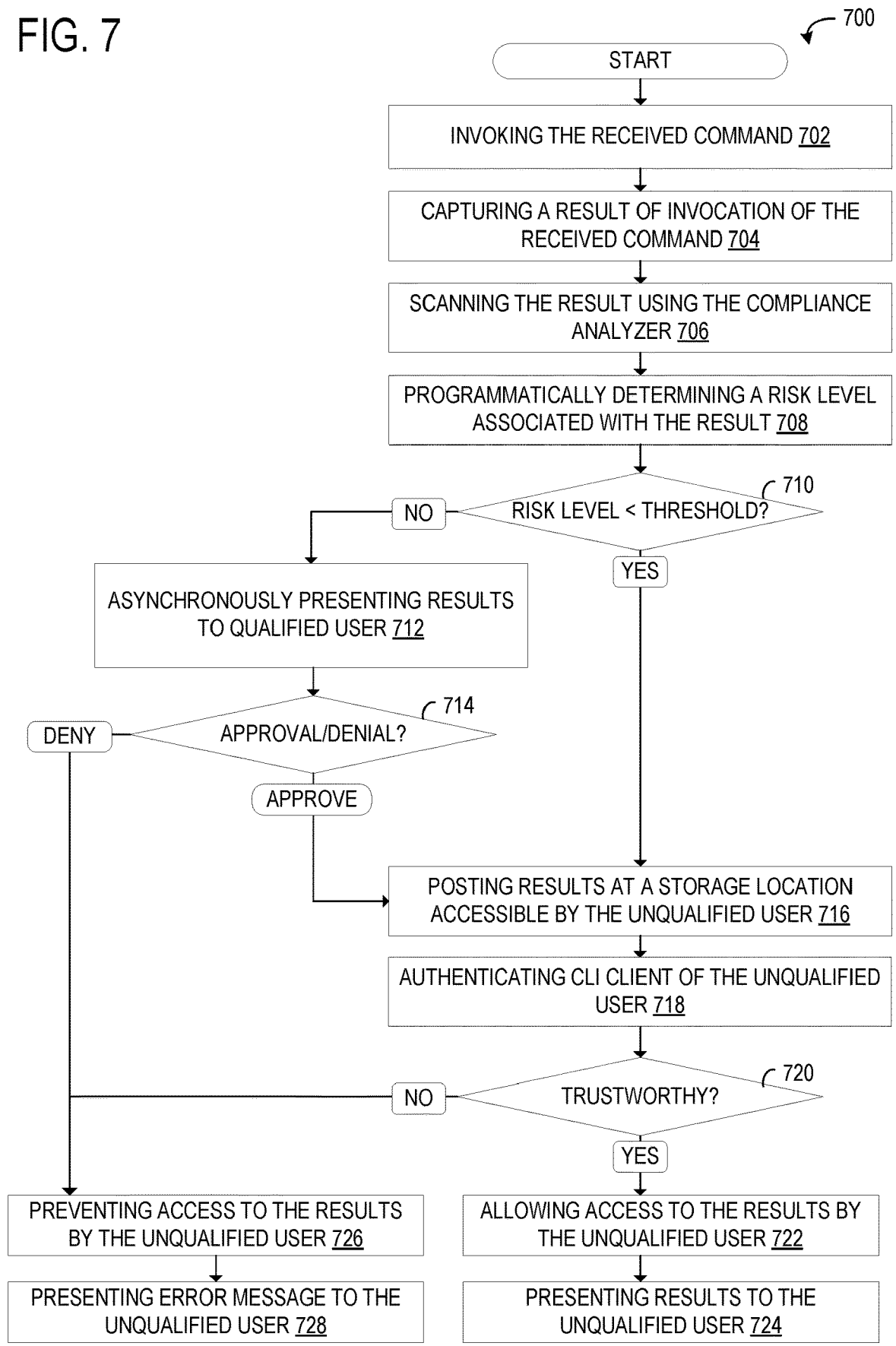
FIG. 7 shows a flowchart of a computer-implemented method for processing a result of invocation of a received command using a compliance analyzer and asynchronously presenting the result to a qualified user for review, according to one embodiment of the present disclosure.

FIG. 7 shows a flowchart for a method 700 for asynchronously presenting the result of data capture of an invoked command for review by a qualified user.

At 702, the method 700 may include invoking the received command. In one example, step 702 may proceed from step 624 of the method 600. The received command may be invoked on a secure server system of the sovereign cloud computing platform using a command runner.

At 704, the method 700 may include capturing a result of invocation of the received command on the sovereign cloud computing platform. The result may be held and prevented from being accessed by the unqualified user that sent the command during the escorted session until the qualified user has reviewed the content of the result.

At 706, the method 700 may include scanning the result using the compliance analyzer to programmatically determine whether to present the result for review by the qualified user supervising the escorted session. In this example, the compliance analyzer may include a risk analysis module that may be configured to estimate risk values associated with different types of data, different sources of data, and other characteristics that may have the potential of causing a data breach.

At 708, the method 700 may include programmatically determining a risk level associated with the result.

At 710, the method 700 may include determining whether the risk level for the result is below a threshold risk level. A value for the threshold risk level may be set according to the rules and protocols of the sovereign cloud computing platform.

If the risk level is below the threshold risk level, the method 700 may proceed directly to step 716. On the other hand, if the risk level is above the threshold risk level, the method 700 may proceed to step 712, and may include determining that the result will be presented to the qualified user.

At step 712, the method 700 may include asynchronously presenting the result to the qualified user. The result may be presented using a SSM GUI. At 714, the method 700 may include receiving an indication of approval or denial of unqualified user access to the result from the qualified user.

If an indication of denial is received from the qualified user, the method 700 may proceed to step 726, and the method 700 may include preventing access to the result by the unqualified user. The method 700 may proceed from step 726 to step 728, and may include presenting an error message to the unqualified user. The error message may indicate that the result for the submitted command was denied by the qualified user.

On the other hand, if an indication of approval is received from the qualified user, the method 700 may proceed to step 716, and may include posting the result at a storage location accessible by the unqualified user. For example, the result may be posted at an endpoint that is network accessible by the computer device of the unqualified user.

Before allowing the unqualified user to access the result, the method 700 may proceed to step 718 and may include authenticating the command-line interface client of the unqualified user. Any suitable authentication protocol may be used to determine that the same command-line interface client is requesting access to the result as the command-line interface client that submitted the command in the escorted session.

If the command-line interface client of the unqualified user is untrustworthy, the method 700 may proceed to step 726 and may include preventing access to the results by the unqualified user.

On the other hand, if the command-line interface client is trustworthy, the method 700 may processed to step 722, and may include allowing access to the result by the unqualified user. For example, a link to the endpoint that includes the result may be given to the unqualified user. At step 724, the method 700 may include presenting the result to the unqualified user.

The techniques and methods described above provide the potential benefit of providing a qualified user with the tools and interfaces to asynchronously supervise a plurality of unqualified users, such as, for example, ten, fifteen, twenty, or more unqualified users. By enabling each qualified user to supervise more than one unqualified user at a time, the method described herein provide the potential benefit of improved scalability of the system, and improved service for customers of the sovereign cloud computing platform services.

Figure 8:
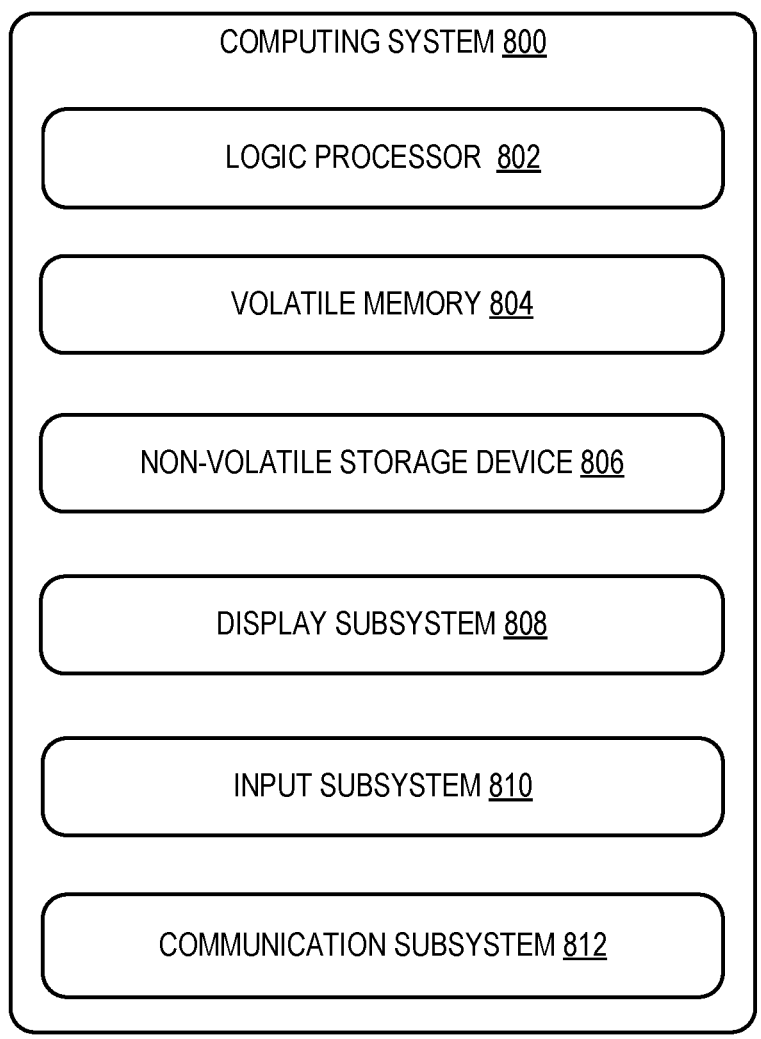
FIG. 8 shows a schematic view of an example computing environment in which the computer system of FIG. 1 may be enacted.

FIG. 8 schematically shows a non-limiting embodiment of a computing system 800 that can enact one or more of the methods and processes described above. Computing system 800 is shown in simplified form. Computing system 800 may embody the computer system 10 described above and illustrated in FIG. 1. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

The following paragraphs provide additional support for the claims of the subject application. One aspect provides a computer system comprising one or more processors configured to execute a secure sovereign manager that controls remote execution of commands on a sovereign cloud computing platform. The secure sovereign manager is configured to create an escorted session for an unqualified user for invoking commands on the sovereign cloud computing platform. The unqualified user does not have sovereign-trusted credentials that define qualifications required for accessing the sovereign cloud computing platform. The escorted session is asynchronously supervised by a qualified user that has sovereign-trusted credentials. The secure sovereign manager is configured to receive a command from the unqualified user in the escorted session, and process the received command using a compliance analyzer to programmatically determine whether to present the received command for review by the qualified user supervising the escorted session. Based on at least a determination to present the received command for review, the secure sovereign manager is configured to asynchronously present the received command to the qualified user, and receive an indication of approval or denial of invocation of the received command from the qualified user. The secure sovereign manager is further configured to, based on at least receiving an indication of approval, invoke the received command on the sovereign cloud computing platform, or based on at least receiving an indication of denial, prevent invocation of the received command and send an error message to the unqualified user.

In this aspect, additionally or alternatively, the compliance analyzer may include a curated list of approved commands. To programmatically determine whether to present the received command for review by the qualified user supervising the escorted session, the compliance analyzer may be further configured to determine that the received command is included in the curated list of approved commands, determine that the received command will not be presented for review by the qualified user supervising the escorted session, and cause the received command to be invoked on the sovereign cloud computing platform. In this aspect, additionally or alternatively, the compliance analyzer may include a curated list of forbidden commands. To programmatically determine whether to present the received command for review by the qualified user supervising the escorted session, the compliance analyzer may be further configured to determine that the received command is included in the curated list of forbidden commands, determine that the received command will not be presented for review by the qualified user supervising the escorted session, and prevent invocation of the received command and send an error message to the unqualified user.

In this aspect, additionally or alternatively, the compliance analyzer may include a risk analysis module configured to determine a risk value that indicates a potential security risk to the sovereign cloud computing platform associated with invoking commands. To programmatically determine whether to present the received command for review by the qualified user supervising the escorted session, the compliance analyzer may be further configured to process the received command using the risk analysis module to determine a risk value associated with the received command, determine that the received command will be presented for review by the qualified user supervising the escorted session based on at least the risk value associated with the received command, and cause the received command and the determined risk value to be asynchronously presented to the qualified user. In this aspect, additionally or alternatively, the risk analysis module may include a machine learning model that is feedback trained to learn risk values associated with each command using a dataset of indications of approval or denial of invocation of each of those commands received from qualified users.

In this aspect, additionally or alternatively, the secure sovereign manager may be configured to generate a summary of commands that have been received from the unqualified user in the escorted session, and asynchronously present the summary of commands alongside the received command to the qualified user supervising the escorted session. In this aspect, additionally or alternatively, the secure sovereign manager may be configured to receive a modification input from the qualified user that includes a modification to the received command, modify the received command based on the modification input, and receive an indication of approval of invocation for the received command that has been modified based on the modification input. In this aspect, additionally or alternatively, the secure sovereign manager may be configured to create a plurality of escorted sessions for a plurality of unqualified users, the plurality of escorted sessions being asynchronously supervised by the qualified user. In this aspect, additionally or alternatively, the secure sovereign manager may be further configured to verify a sovereign-trusted credential of the qualified user using a credential manager associated with the sovereign cloud computing platform, attach the verified sovereign-trusted credential of the qualified user to invoked commands that were approved by the qualified user, and store a log of invoked commands that were approved by the qualified user.

In this aspect, additionally or alternatively, the secure sovereign manager may be further configured to capture a result of invocation of the received command on the sovereign cloud computing platform, scan the result using the compliance analyzer to programmatically determine whether to present the result for review by the qualified user supervising the escorted session. Based on at least a determination to present the result for review, the secure sovereign manager may be configured to asynchronously present the result to the qualified user, and receive an indication of approval or denial of unqualified user access to the result from the qualified user. The secure sovereign manager is further configured to, based on at least receiving an indication of approval, the secure sovereign manager may be configured to post the result at a storage location accessible by the unqualified user, or based on at least receiving an indication of denial, prevent access to the result by the unqualified user.

In this aspect, additionally or alternatively, the secure sovereign manager may be further configured to receive a modification input from the qualified user that includes a content modification to the result, modify a content of the result based on the modification input, and receive an indication of approval of unqualified user access to the result that has been modified based on the modification input. In this aspect, additionally or alternatively, the modification input may be a redaction of one or more portions of content of the result.

Another aspect provides a method comprising, at one or more processors executing a secure sovereign manager that controls remote execution of commands on a sovereign cloud computing platform, creating an escorted session for an unqualified user for invoking commands on the sovereign cloud computing platform. The unqualified user does not have sovereign-trusted credentials that define qualifications required for accessing the sovereign cloud computing platform. The escorted session is asynchronously supervised by a qualified user that has sovereign-trusted credentials. The method further comprises receiving a command from the unqualified user in the escorted session, and processing the received command using a compliance analyzer to programmatically determine whether to present the received command for review by the qualified user supervising the escorted session. Based on at least a determination to present the received command for review, the method further comprises asynchronously presenting the received command to the qualified user, and receiving an indication of approval or denial of invocation of the received command from the qualified user. The method further comprises, based on at least receiving an indication of approval, invoking the received command on the sovereign cloud computing platform, or based on at least receiving an indication of denial, preventing invocation of the received command and send an error message to the unqualified user.

In this aspect, additionally or alternatively, the compliance analyzer may include a curated list of approved commands. Programmatically determining whether to present the received command for review by the qualified user supervising the escorted session may further comprise determining that the received command is included in the curated list of approved commands, determining that the received command will not be presented for review by the qualified user supervising the escorted session, and causing the received command to be invoked on the sovereign cloud computing platform. In this aspect, additionally or alternatively, the compliance analyzer may include a curated list of forbidden commands. Programmatically determining whether to present the received command for review by the qualified user supervising the escorted session may further comprise determining that the received command is included in the curated list of forbidden commands, determining that the received command will not be presented for review by the qualified user supervising the escorted session, and preventing invocation of the received command and send an error message to the unqualified user.

In this aspect, additionally or alternatively, the compliance analyzer may include a risk analysis module configured to determine a risk value that indicates a potential security risk to the sovereign cloud computing platform associated with invoking commands. Programmatically determining whether to present the received command for review by the qualified user supervising the escorted session may further comprise processing the received command using the risk analysis module to determine a risk value associated with the received command, determining that the received command will be presented for review by the qualified user supervising the escorted session based on at least the risk value associated with the received command, and causing the received command and the determined risk value to be asynchronously presented to the qualified user. In this aspect, additionally or alternatively, the method may further comprise capturing a result of invocation of the received command on the sovereign cloud computing platform, and scanning the result using the compliance analyzer to programmatically determine whether to present the result for review by the qualified user supervising the escorted session. Based on at least a determination to present the result for review, the method may further comprise asynchronously presenting the result to the qualified user, and receiving an indication of approval or denial of unqualified user access to the result from the qualified user. The method may further comprise, based on at least receiving an indication of approval, posting the result at a storage location accessible by the unqualified user, or based on at least receiving an indication of denial, preventing access to the result by the unqualified user.

In this aspect, additionally or alternatively, the method may further comprise receiving a modification input from the qualified user that includes a content modification to the result, modifying a content of the result based on the modification input, and receiving an indication of approval of unqualified user access to the result that has been modified based on the modification input. In this aspect, additionally or alternatively, the modification input may be a redaction of one or more portions of content of the result.

Another aspect provides a computer system comprising one or more processors configured to execute a secure sovereign manager that controls remote execution of commands on a sovereign cloud computing platform that is controlled by a government entity of a sovereign nation. The secure sovereign manager is configured to create an escorted session for an unqualified user for invoking commands on the sovereign cloud computing platform. The unqualified user does not have sovereign-trusted credentials that define qualifications required for accessing the sovereign cloud computing platform. The escorted session is asynchronously supervised by a qualified user that has sovereign-trusted credentials. The sovereign-trusted credentials include one or more of a citizenship and a security clearance for the government entity of the sovereign nation. The secure sovereign manager is further configured to receive a command from the unqualified user in the escorted session, asynchronously present the received command to the qualified user, and receive an indication of approval or denial of invocation of the received command from the qualified user. The secure sovereign manager is further configured to, based on at least receiving an indication of approval, invoke the received command on the sovereign cloud computing platform, or based on at least receiving an indication of denial, prevent invocation of the received command and send an error message to the unqualified user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
   one or more processors configured to execute a secure sovereign manager that controls remote execution of commands on a sovereign cloud computing platform, wherein the secure sovereign manager is configured to:
   create an escorted session for an unqualified user for invoking commands on the sovereign cloud computing platform, wherein the unqualified user does not have sovereign-trusted credentials that define qualifications required for accessing the sovereign cloud computing platform, and wherein the escorted session is asynchronously supervised by a qualified user that has sovereign-trusted credentials;
   receive a command from the unqualified user in the escorted session;
   process the received command using a compliance analyzer to programmatically determine whether to present the received command for review by the qualified user supervising the escorted session wherein:
   the compliance analyzer includes a curated list of forbidden commands; and
   to programmatically determine whether to present the received command for review by the qualified user supervising the escorted session, the compliance analyzer is configured at least to determine whether the received command is included in the curated list of forbidden commands; and
   based at least in part on a determination of whether to present the received command for review:
   (a) determine that the received command will not be presented for review by the qualified user supervising the escorted session, prevent invocation of the received command, and send an error message to the unqualified user; or
   (b) asynchronously present the received command to the qualified user,
   receive an indication of approval or denial of invocation of the received command from the qualified user, and
   (b1) based on at least receiving an indication of approval, invoke the received command on the sovereign cloud computing platform; or
   (b2) based on at least receiving an indication of denial, prevent invocation of the received command and send an error message to the unqualified user.

2. The computer system of claim 1, wherein the compliance analyzer includes a curated list of approved commands, and
   wherein to programmatically determine whether to present the received command for review by the qualified user supervising the escorted session, the compliance analyzer is further configured to:
   determine that the received command is included in the curated list of approved commands;
   determine that the received command will not be presented for review by the qualified user supervising the escorted session; and
   cause the received command to be invoked on the sovereign cloud computing platform.

3. The computer system of claim 1, wherein the compliance analyzer includes a risk analysis module configured to determine a risk value that indicates a potential security risk to the sovereign cloud computing platform associated with invoking commands, and
    wherein to programmatically determine whether to present the received command for review by the qualified user supervising the escorted session, the compliance analyzer is further configured to:
      process the received command using the risk analysis module to determine a risk value associated with the received command;
      determine that the received command will be presented for review by the qualified user supervising the escorted session based on at least the risk value associated with the received command; and
      cause the received command and the determined risk value to be asynchronously presented to the qualified user.

4. The computer system of claim 3, wherein the risk analysis module includes a machine learning model that is feedback trained to learn risk values associated with each command using a dataset of indications of approval or denial of invocation of each of those commands received from qualified users.

5. The computer system of claim 1, wherein the secure sovereign manager is configured to:
    generate a summary of commands that have been received from the unqualified user in the escorted session; and
    asynchronously present the summary of commands alongside the received command to the qualified user supervising the escorted session.

6. The computer system of claim 1, wherein the secure sovereign manager is configured to:
    receive a modification input from the qualified user that includes a modification to the received command;
    modify the received command based on the modification input; and
    receive an indication of approval of invocation for the received command that has been modified based on the modification input.

7. The computer system of claim 1, wherein the secure sovereign manager is configured to create a plurality of escorted sessions for a plurality of unqualified users, the plurality of escorted sessions being asynchronously supervised by the qualified user.

8. The computer system of claim 1, wherein the secure sovereign manager is further configured to:
    verify a sovereign-trusted credential of the qualified user using a credential manager associated with the sovereign cloud computing platform;
    attach the verified sovereign-trusted credential of the qualified user to invoked commands that were approved by the qualified user; and
    store a log of invoked commands that were approved by the qualified user.

9. The computer system of claim 1, wherein the secure sovereign manager is further configured to:
    capture a result of invocation of the received command on the sovereign cloud computing platform;
    scan the result using the compliance analyzer to programmatically determine whether to present the result for review by the qualified user supervising the escorted session;
    based on at least a determination to present the result for review, asynchronously present the result to the qualified user;
    receive an indication of approval or denial of unqualified user access to the result from the qualified user; and
    based on at least receiving an indication of approval, post the result at a storage location accessible by the unqualified user; or
    based on at least receiving an indication of denial, prevent access to the result by the unqualified user.

10. The computer system of claim 9, wherein the secure sovereign manager is further configured to:
    receive a modification input from the qualified user that includes a content modification to the result;
    modify a content of the result based on the modification input; and
    receive an indication of approval of unqualified user access to the result that has been modified based on the modification input.

11. The computer system of claim 10, wherein the modification input is a redaction of one or more portions of content of the result.

12. A method comprising:
    at one or more processors executing a secure sovereign manager that controls remote execution of commands on a sovereign cloud computing platform:
      creating an escorted session for an unqualified user for invoking commands on the sovereign cloud computing platform, wherein the unqualified user does not have sovereign-trusted credentials that define qualifications required for accessing the sovereign cloud computing platform, and wherein the escorted session is asynchronously supervised by a qualified user that has sovereign-trusted credentials;
      receiving a command from the unqualified user in the escorted session;
      processing the received command using a compliance analyzer to programmatically determine whether to present the received command for review by the qualified user supervising the escorted session, wherein:
        the compliance analyzer includes a curated list of forbidden commands; and
        programmatically determining whether to present the received command for review by the qualified user supervising the escorted session includes determining whether the received command is included in the curated list of forbidden commands; and
      based at least in part on a determination of whether to present the received command for review:
        (a) determining that the received command will not be presented for review by the qualified user supervising the escorted session, preventing invocation of the received command, and sending an error message to the unqualified user; or
        (b) asynchronously presenting the received command to the qualified user,
        receiving an indication of approval or denial of invocation of the received command from the qualified user, and
        (b1) based on at least receiving an indication of approval, invoking the received command on the sovereign cloud computing platform; or
        (b2) based on at least receiving an indication of denial, preventing invocation of the received command and send an error message to the unqualified user.

13. The method of claim 12, wherein the compliance analyzer includes a curated list of approved commands, and wherein programmatically determining whether to present the received command for review by the qualified user supervising the escorted session, further comprises:
  determining that the received command is included in the curated list of approved commands;
  determining that the received command will not be presented for review by the qualified user supervising the escorted session; and
  causing the received command to be invoked on the sovereign cloud computing platform.

14. The method of claim 12, wherein the compliance analyzer includes a risk analysis module configured to determine a risk value that indicates a potential security risk to the sovereign cloud computing platform associated with invoking commands, and wherein programmatically determining whether to present the received command for review by the qualified user supervising the escorted session, further comprises:
  processing the received command using the risk analysis module to determine a risk value associated with the received command;
  determining that the received command will be presented for review by the qualified user supervising the escorted session based on at least the risk value associated with the received command; and
  causing the received command and the determined risk value to be asynchronously presented to the qualified user.

15. The method of claim 12, further comprising:
  capturing a result of invocation of the received command on the sovereign cloud computing platform;
  scanning the result using the compliance analyzer to programmatically determine whether to present the result for review by the qualified user supervising the escorted session;
  based on at least a determination to present the result for review, asynchronously presenting the result to the qualified user;
  receiving an indication of approval or denial of unqualified user access to the result from the qualified user; and
  based on at least receiving an indication of approval, posting the result at a storage location accessible by the unqualified user; or
  based on at least receiving an indication of denial, preventing access to the result by the unqualified user.

16. The method of claim 15, further comprising:
  receiving a modification input from the qualified user that includes a content modification to the result;
  modifying a content of the result based on the modification input; and
  receiving an indication of approval of unqualified user access to the result that has been modified based on the modification input.

17. The method of claim 16, wherein the modification input is a redaction of one or more portions of content of the result.

18. A computer system comprising:
one or more processors configured to execute a secure sovereign manager that controls remote execution of commands on a sovereign cloud computing platform that is controlled by a government entity of a sovereign nation, wherein the secure sovereign manager is configured to:
  create an escorted session for an unqualified user for invoking commands on the sovereign cloud computing platform, wherein the unqualified user does not have sovereign-trusted credentials that define qualifications required for accessing the sovereign cloud computing platform, wherein the escorted session is asynchronously supervised by a qualified user that has sovereign-trusted credentials, and wherein the sovereign-trusted credentials include one or more of a citizenship and a security clearance for the government entity of the sovereign nation;
  receive a command from the unqualified user in the escorted session;
    process the received command using a compliance analyzer to programmatically determine whether to present the received command for review by the qualified user supervising the escorted session, wherein:
    the compliance analyzer includes a curated list of forbidden commands; and
    to programmatically determine whether to present the received command for review by the qualified user supervising the escorted session, the compliance analyzer is configured at least to determine whether the received command is included in the curated list of forbidden commands; and
  based at least in part on a determination of whether to present the received command for review:
    (a) determine that the received command will not be presented for review by the qualified user supervising the escorted session, prevent invocation of the received command, and send an error message to the unqualified user; or
    (b) asynchronously present the received command to the qualified user
  receive an indication of approval or denial of invocation of the received command from the qualified user, and
    (b1) based on at least receiving an indication of approval, invoke the received command on the sovereign cloud computing platform; or
    (b2) based on at least receiving an indication of denial, prevent invocation of the received command and send an error message to the unqualified user.

* * * * *